US011277687B1

(12) United States Patent
Stidsen et al.

(10) Patent No.: US 11,277,687 B1
(45) Date of Patent: Mar. 15, 2022

(54) POWER OVER ETHERNET (POE) POWERED SMART SPEAKER

(71) Applicant: Lenbrook Industries Limited, Pickering (CA)

(72) Inventors: Gregory R. Stidsen, Andover, MA (US); Paul Barton, Port Perry (CA); Jens Torben Sonderskov, Toronto (CA); Ross Graham Gordon Eberlin, Aurora (CA)

(73) Assignee: Lenbrook Industries Limited, Pickering (CA)

( * ) Notice: Subject to any disclaimer, the term of this patent is extended or adjusted under 35 U.S.C. 154(b) by 0 days.

(21) Appl. No.: 17/360,501

(22) Filed: Jun. 28, 2021

(51) Int. Cl.
*H04R 3/00* (2006.01)
*H04R 1/02* (2006.01)
(Continued)

(52) U.S. Cl.
CPC ............. *H04R 3/007* (2013.01); *G06F 3/162* (2013.01); *H01R 13/5205* (2013.01); *H04R 1/02* (2013.01);
(Continued)

(58) Field of Classification Search
CPC . H04R 1/00; H04R 1/02; H04R 1/021; H04R 1/025; H04R 1/028; H04R 3/00; H04R 3/007; H04R 29/00; H04R 29/001; H04R 29/002; H04R 29/003; H04R 9/06; H04R 9/022; H04R 2201/028;
(Continued)

(56) References Cited

U.S. PATENT DOCUMENTS

2005/0131558 A1* 6/2005 Braithwaite ........... H04R 27/00
700/94
2015/0263684 A1* 9/2015 Tu ......................... H04R 3/007
381/120

(Continued)

FOREIGN PATENT DOCUMENTS

WO WO-2018/005895 A1 1/2018

OTHER PUBLICATIONS

Ice et al., "Understanding the IEEE 802.3bt PoE Standard," Silicon Labs: 9 pages (2020).

(Continued)

*Primary Examiner* — Thang V Tran
(74) *Attorney, Agent, or Firm* — Foley Hoag LLP; Rajesh Vallabh (57) ABSTRACT

A networked speaker device includes a sealed housing and an Ethernet port in the housing for receiving power and audio data from a network router via an Ethernet cable. A power supply subsystem in the housing manages the power received at the Ethernet port. A microprocessor subsystem, powered by the power supply subsystem, receives and processes the audio data to generate output audio signals. A digital audio amplifier, powered by the power supply subsystem, amplifies the output audio signals to drive a speaker driver to render an audio output. The device also includes at least one heater resistor in the housing powered by the power supply subsystem. The at least one heater resistor is controlled by the microprocessor subsystem to automatically heat the interior of the housing when temperature inside the housing falls below a given temperature.

25 Claims, 5 Drawing Sheets

(51) Int. Cl.
  *H04R 29/00* (2006.01)
  *H05B 3/00* (2006.01)
  *G06F 3/16* (2006.01)
  *H01R 13/52* (2006.01)

(52) U.S. Cl.
  CPC ......... *H05B 3/0019* (2013.01); *H04R 29/001* (2013.01); *H04R 2201/028* (2013.01); *H04R 2420/09* (2013.01)

(58) Field of Classification Search
  CPC ...... H04R 2420/09; G01K 1/08; G01K 13/00; G01K 17/00; G01K 7/00; G01K 7/16; G06F 3/16; G06F 3/162; H01R 13/52; H01R 13/5205; H05B 3/00; H05B 3/0019
  See application file for complete search history.

(56) References Cited

U.S. PATENT DOCUMENTS

2016/0234599 A1\* 8/2016 Beauchamp ............ G06F 3/162
2017/0205858 A1\* 7/2017 Wong ................... H04R 1/2834
2019/0273976 A1\* 9/2019 Starobin ................ H04R 1/026
2021/0084404 A1\* 3/2021 Marra .................. H04R 1/2873

OTHER PUBLICATIONS

Soundtube; "IPD-SM500i-II Surface-Mount PoE Speaker," STNet, IPD-SM500i-II Product Specifications Sheet: 4 pages (2021).
Soundtube; "STNet Switch II," STNet, STNet Switch II Product Specifications Sheet: 1 page (2020).

\* cited by examiner

POWER OVER ETHERNET (POE) POWERED SMART SPEAKER

BACKGROUND

The present application relates generally to smart speakers and, more particularly, to a power over Ethernet (PoE) powered smart speaker.

BRIEF SUMMARY OF THE DISCLOSURE

A networked speaker device in accordance with one or more embodiments includes a sealed housing and an Ethernet port in the housing for receiving power and audio data from a network router via an Ethernet cable. A power supply subsystem in the housing manages the power received at the Ethernet port. A microprocessor subsystem, powered by the power supply subsystem, receives and processes the audio data to generate output audio signals. A digital audio amplifier, powered by the power supply subsystem, amplifies the output audio signals to drive a speaker driver to render an audio output. The device also includes at least one heater resistor in the housing powered by the power supply subsystem. The at least one heater resistor is controlled by the microprocessor subsystem to automatically heat the interior of the housing when temperature inside the housing falls below a given temperature.

BRIEF DESCRIPTION OF THE DRAWINGS

Like or identical reference numbers are used to identify common or similar elements.

DETAILED DESCRIPTION

Various embodiments disclosed herein relate to smart speakers that receive both audio data and power over an Ethernet cable from power-sourcing equipment such as PoE enabled network switches and routers. PoE powered speakers eliminate the need to install electrical receptacles and equipment otherwise needed to power the speakers.

Figure 1A:
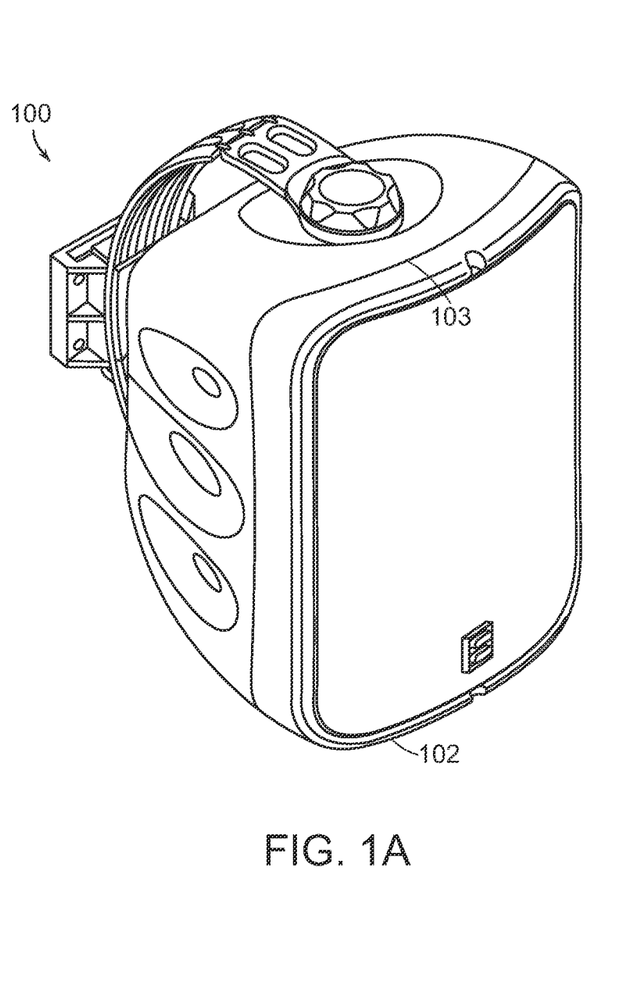
FIGS. 1A and 1B illustrate an exemplary PoE powered smart speaker in accordance with one or more embodiments.
Figure 1B:
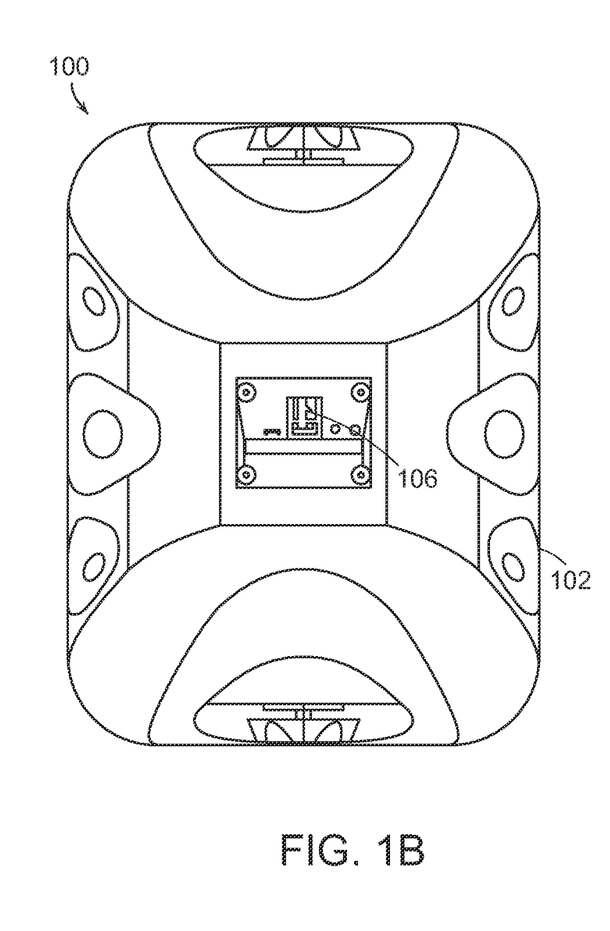

FIGS. 1A and 1B illustrate an exemplary PoE powered smart speaker 100 in accordance with one or more embodiments. The smart speaker 100 includes a sealed outer housing 102. An Ethernet cable can be coupled to an Ethernet port 106 at the rear of the housing 102, enabling the speaker to receive power and audio data transmitted over the Ethernet cable.

Figure 2:
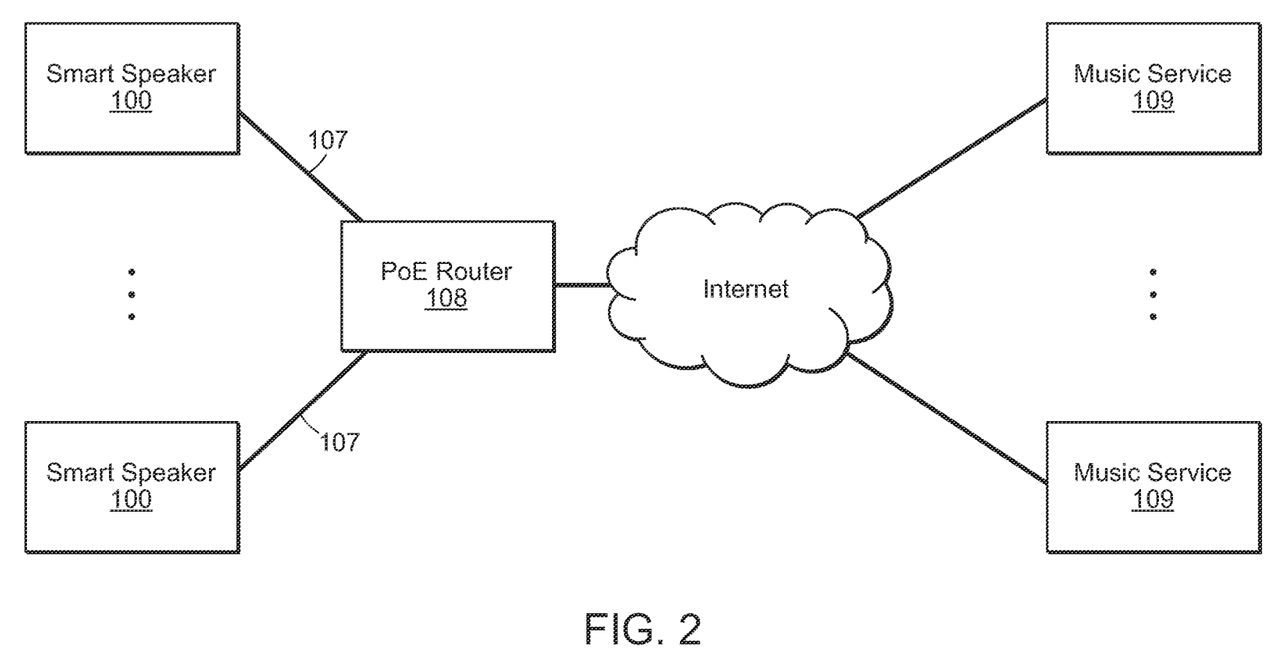
FIG. 2 is a block diagram illustrating an exemplary network including a plurality of smart speakers in accordance with one or more embodiments.

As shown in FIG. 2, the smart speaker 100 can be one of a set of smart speakers 100 that are connected by Ethernet cables 107 to a PoE router 108 in a network. The smart speakers 100 access the Internet via the PoE router 108 in order to receive music streams from online music services 109 (e.g., Spotify™, Amazon Music™, Qobuz™, and Tidal™).

Figure 3:
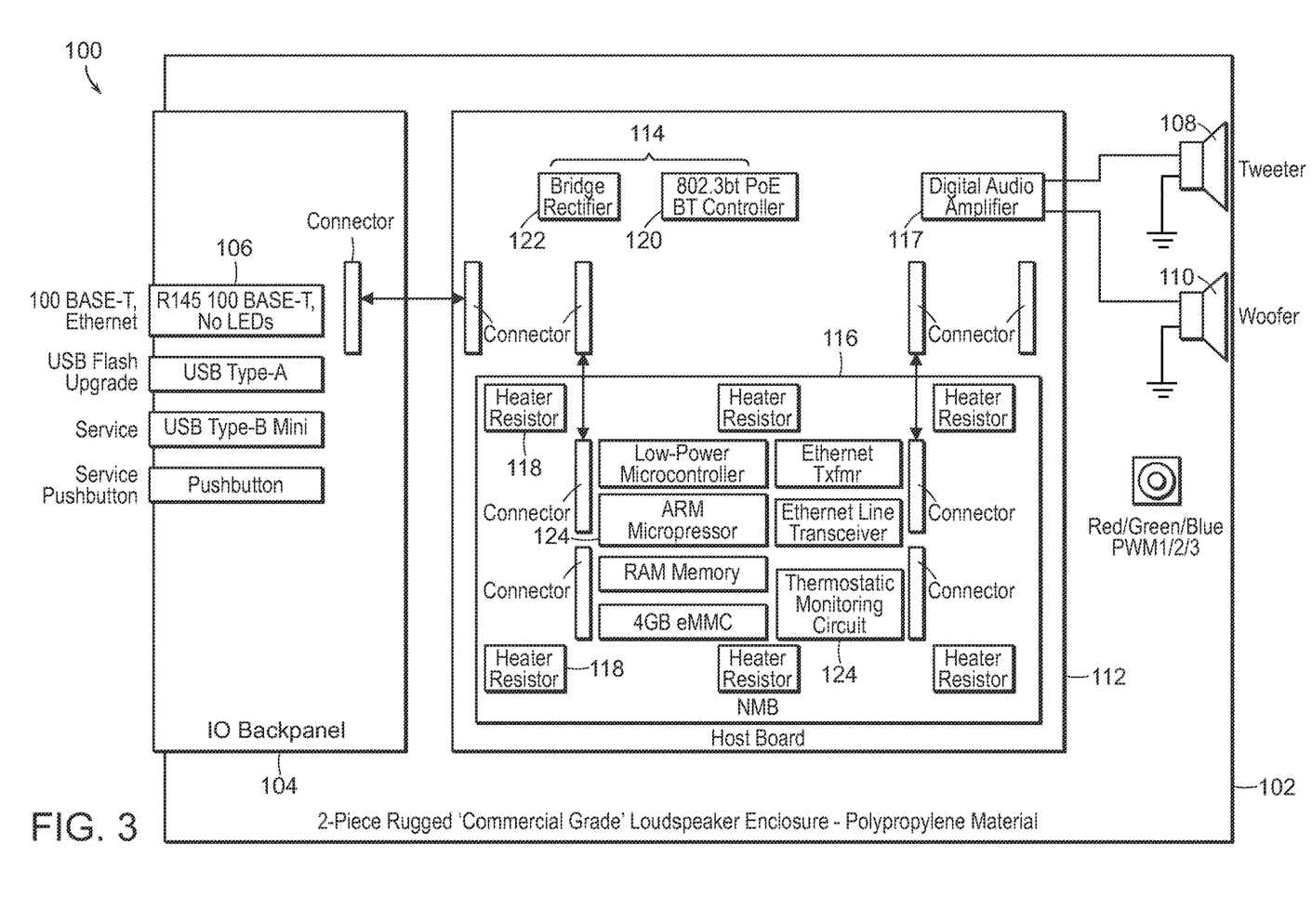
FIG. 3 is a simplified block diagram illustrating various components of the smart speaker in accordance with one or more embodiments.

FIG. 3 is a simplified block diagram illustrating various components of an exemplary smart speaker 100.

An input/output (I/O) backpanel 104 in the housing 102 includes the Ethernet port 106.

The smart speaker 100 includes one or more speaker drivers. In the exemplary embodiment, the speaker drivers comprise a tweeter 108 and a woofer 110.

A host board 112 in the housing 102 includes a power supply subsystem 114 for managing the power received at the Ethernet port 106.

A microprocessor subsystem 116 on the host board 112 is powered by the power supply subsystem 114. The microprocessor subsystem 116 is configured to receive and process the audio data to generate output audio signals.

A digital audio amplifier 117 on the host board 112 is powered by the power supply subsystem 114. The digital audio amplifier 117 amplifies the output audio signals received from the microprocessor subsystem 116 to drive the tweeter 108 and woofer 110 to render an audio output.

A set of heater resistors 118 on the host board 112 is powered by the power supply subsystem 114. The heater resistors 118 are controlled by the microprocessor subsystem 116 to heat the interior of the housing 102 when the temperature inside the housing 102 is below a given temperature.

The smart speaker 100 uses several technical advancements to deliver high sound quality. The dedicated, efficient power supply subsystem 114 is capable of extracting significantly more energy available from an Ethernet cable by using four copper pairs of the Ethernet cable connecting the speaker to a PoE network router 108. The additional energy produced by this power supply 114 allows the smart speaker 100 to provide power to the networked microprocessor subsystem 116 and the high-quality digital audio amplifier 117. The smart speaker's 'four-pair' PoE power supply is an improvement over the power supplies of previous PoE speakers, which only enabled two pairs of the Ethernet cable for power delivery. Two-pair PoE power supply technology cannot deliver the energy required to simultaneously supply a networked microprocessor core and audio amplifier 117 with the electrical power needed to render high-resolution digital audio streams from a variety of popular music services 109 (e.g., Spotify™, Amazon Music™ or Qobuz™).

In one or more embodiments, a specialized digital amplifier 117 is used to increase power efficiency by 30% to maximize utilization of limited energy available from PoE power supply subsystem 114.

The power supply subsystem 114 monitors the Ethernet cable connection for the availability of electrical power from the PoE-enabled network router 108 according to IEEE 802.3bt PoE standards. The power supply 114 executes this with a dedicated network power controller device 120. Although the power controller device 120 is monitored by the microprocessor subsystem 116 through two simple status signals, the power supply controller 120 implements all functions for converting the electrical energy available from four pairs of the Ethernet cable. The network power supply controller 120 performs this independently from any software implementation executing in the microprocessor subsystem 116. Upon connection of the smart speaker's network cable, the power supply controller 120 automatically requests the maximum power available from the 802.3bt PoE network switch or router. Before applying power to four pairs of the network cable, the PoE network switch or router indicates the power available through set of sequential cycles. A maximum power of 71 Watts may be supplied to the smart speaker according to the 802.3bt PoE networking standard for four-pair power delivery over Ethernet cables. The power is delivered over the cable as alternating current, which requires the smart speaker's power supply 114 to include a diode bridge rectifier 122 for converting the Ethernet line voltage to direct current (DC). The power supply subsystem's main output is approximately 26 Volts DC, which is suitable for directly supplying the smart speaker's audio amplifier 117. As the microprocessor subsystem 116 requires 5 Volts DC, the power supply subsystem 114 includes a separate 'step-down' switch-mode power supply circuit, which converts the main 26 Volt DC voltage to 5 Volts DC. The step-down circuit is designed to operate with at least 85% efficiency to minimize waste of the energy and reserve as much useful power for the microprocessor subsystem 116 and the amplifier 117 to render music from high-resolution music services.

In the exemplary embodiment, the microprocessor subsystem 116 includes a 1 GHz ARM A53 processing core 124 and supports a minimum of 256 Megabytes of high-speed random-access memory (RAM). The processing capacity of this microprocessor 124 facilitates processing of high-resolution audio data streams pulled from music services 109 through the connected PoE networking router 108 and its Internet connection. The processing power enables high-resolution audio, as it can require as much four times the bandwidth of standard definition or 'compact disc' quality audio. This includes emerging, specialty high-resolution audio formats such as MQA™, which requires further post-processing to fully authenticate and render this format.

The microprocessor subsystem's operating power budget allows execution of an advanced operating system such as, e.g., the full BluOS™ networked operating system available from Lenbrook. BluOS™ facilitates connection to iOS™ and Android™ devices running a BluOS™ software app. This app allows users to easily select high-resolution music for playback across one or more PoE smart speakers 100 connected to the network. As the microprocessor subsystem 116 has sufficient power, it allows the user to quickly search and select from thousands of songs available either from Internet music services or local music libraries stored on dedicated music servers connected to the same local area network as the PoE smart speaker(s) 100. Power supplied to the microprocessor subsystem 116 by PoE allows effective use of flash memory, e.g., up to 64 Gigabytes of flash memory. Flash memory allows for storage or 'caching' of the most popular music and can be essential in commercial audio installations (e.g., restaurants and hotels) that must maintain continuous music playback in the event of Internet or music service outages. At least one commercial-grade Internet service actually requires memory caching in the smart speakers it certifies to meet music uptime specifications it guarantees to its corporate customers.

To delivery high sound quality, the microprocessor and amplifier chipsets 116, 117 should have sufficient digital capacity to support high-resolution or 'HiRes' digital audio sampling rates. Compact disc (CD) quality at 44.1 kHz sampling rate and 16 bits per sample ('bit depth') is considered 'standard' digital resolution and high-resolution is anything greater than this. In the exemplary embodiment, the microprocessor subsystem 116 and audio amplifier 117 support 4x the sampling (192 kHz) rate and 1.3x the bit depth (24 bits) of a CD. Analogous to High-Definition television, this extended HiRes audio data capacity provides wide-band frequency response and extended dynamic range at the PoE speaker's output.

The PoE router 108 can also include a Wi-Fi network function to provide standard wireless access on the same local area network (LAN) as the PoE speaker 100. Users can install a BluOS™ software app on iOS and Android mobile devices and wirelessly connect their iOS or Android devices to this network. The app uses a discovery software mechanism (LSDP) to automatically 'discover' the PoE speaker and list one or more of the installed PoE speakers within the BluOS™ app, allowing them to browse music available on a selected music service and either select individual songs for playback or compile custom music playlists. Popular Internet radio streams—typically delivered at less than HiRes quality—may also be selected within the BluOS™ app for playback from the PoE speaker from a popular radio stream look-up portal services such as, e.g., TuneIn Radio™.

Multiple PoE speakers 100 operating on the same network may play a single selected audio stream in synchrony. In one or more embodiments, this is implemented by setting each PoE speaker's real-time clock to a common Internet source clock through the Network Time Protocol (NTP) and compensating for differences among the hardware crystal clock source installed in each PoE speaker 100. If a PoE speaker's real-time clock is measured to be advancing faster than those of other PoE speakers 100, its audio clock rate is reduced proportionally by gradually adjusting the microprocessor's phase-locked loop output frequency.

The materials and components of smart speaker 100 that are exposed to its external environment are selected for ruggedness to withstand harsh commercial installation environments. In one or more embodiments, the outer housing 102 of the smart speaker 100 comprises polypropylene material. Polypropylene has advantages over wood, even weatherproof specialty wood materials that are often used in speaker housings. Polypropylene can be molded at much lower cost into two simple pieces for the entire speaker enclosure. The two polypropylene enclosure components are fastened together with a single sealed seam 103 (FIG. 1A). On the other hand, non-moldable wood materials require fastening of multiple pieces (in many cases, at least six pieces), which presents multiple seams. This dramatically increases common points of failure for the enclosure weather sealing. Polypropylene is inert at a molecular level. It is unaffected by moisture and ultraviolet light, and maintains a new appearance. It remains dimensionally stable across a wide ambient temperature range. Polypropylene is also much more thermally insulative than other non-wood materials such as polycarbonate. This is a significant benefit in keeping the system's electronics warm when operating in cold outdoor environments, and helps conserve the electrical power of a thermostatic heating circuit discussed in further detail below.

As the PoE speaker's woofer and tweeter driver components 108, 110 are also exposed to the external environment, waterproof versions of these components provide longevity of the PoE speaker in rugged installation environments.

In one or more exemplary embodiments, the wall thickness of the polypropylene housing is about 6-11 mm to increase rigidity. The polypropylene also provides higher damping of acoustic vibration and reduced distortion.

The set of heater resistors 118 on the host board 112 inside the speaker housing 102 dissipates sufficient thermal energy to prevent the overall system circuitry's temperature from dropping below 0 degrees Celsius. This allows the PoE speaker system hardware to boot in cold weather conditions. A thermostatic monitoring circuit 124 on the host board 112 regulates the power supplied to the heating circuit. This circuit is monitored in real-time by the microprocessor software to automatically enable power delivery to the heater resistors 118 when the system's temperature falls close to 0 degrees Celsius, as this is the minimum operating temperature of the system's microprocessor and microchip silicon. Although microchip silicon chips that operate at temperatures much lower than 0 degrees Celsius are available, this would substantially increase the overall PoE speaker electronics materials cost beyond the cost of the thermostatic monitoring and resistor heater circuitry. The thermostatic circuit and the microprocessor software disable power to the heater resistors 118 at 10 degrees Celsius to conserve as much electrical power as possible for the system's audio amplifier 117 and microprocessor subsystem 116.

Figure 4:
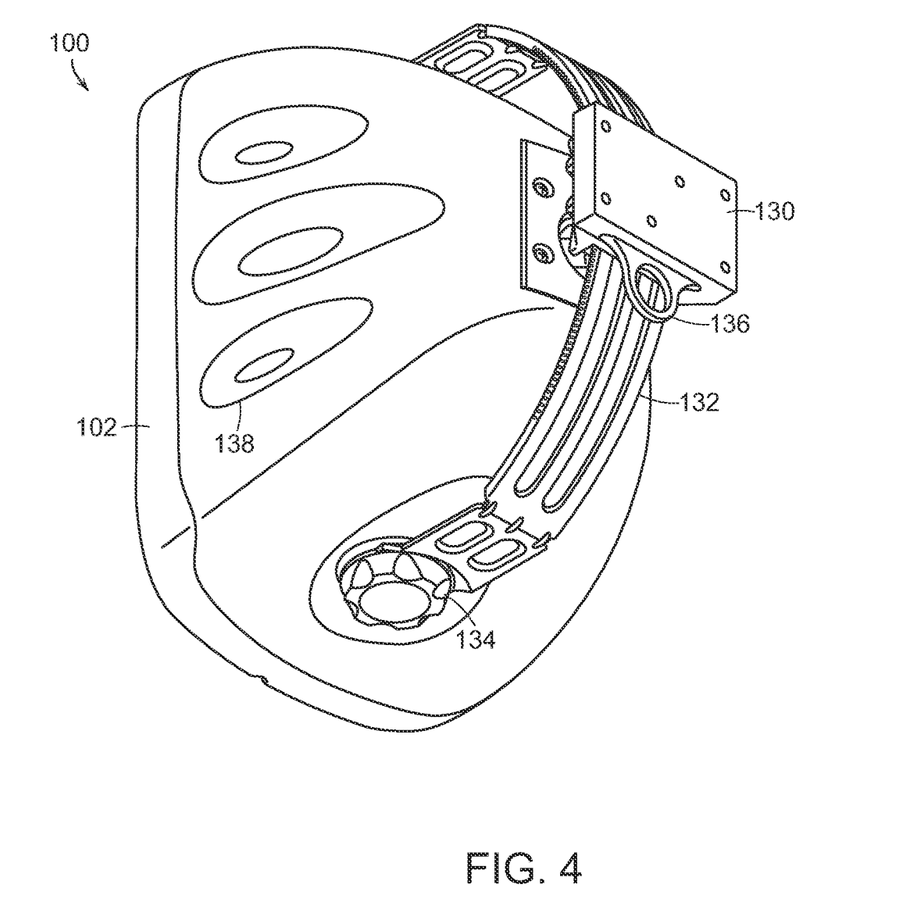
FIG. 4 is a rear perspective view of the smart speaker in accordance with one or more embodiments.

FIG. 4 is a rear perspective view of the smart speaker 100 depicting additional features of the device. A three-piece mounting plate 130 is attached to the speaker housing 102 using an arched mounting band 132. The mounting band 132 is adjustably secured to the housing 102 by two threaded fastening knobs 134. The knobs 134 include ratcheting teeth that securely fix the speaker's forward angle direction, relative to mounting band 132. The mounting plate 130 can be positioned anywhere along the arched mounting band 132, enabling precise adjustment of the angle of the speaker's vertical axis. The three-piece mounting plate 130 also facilitates ease of installation of the smart speaker 100. A technician can anchor the lightweight plate 130 to a surface before maneuvering the heavier speaker 100 into position for fastening to plate 130. The mounting plate 130 includes an attachment feature 136 enabling a steel cord to anchor the speaker 100 to a wall or ceiling surfaces as a safety provision. The speaker housing 102 includes ribs 138 to add strength to the housing wall, as well as to enhance design appeal. The eggshell shape of the housing 102 adds organic design appeal and increases compressive strength.

Figure 5:
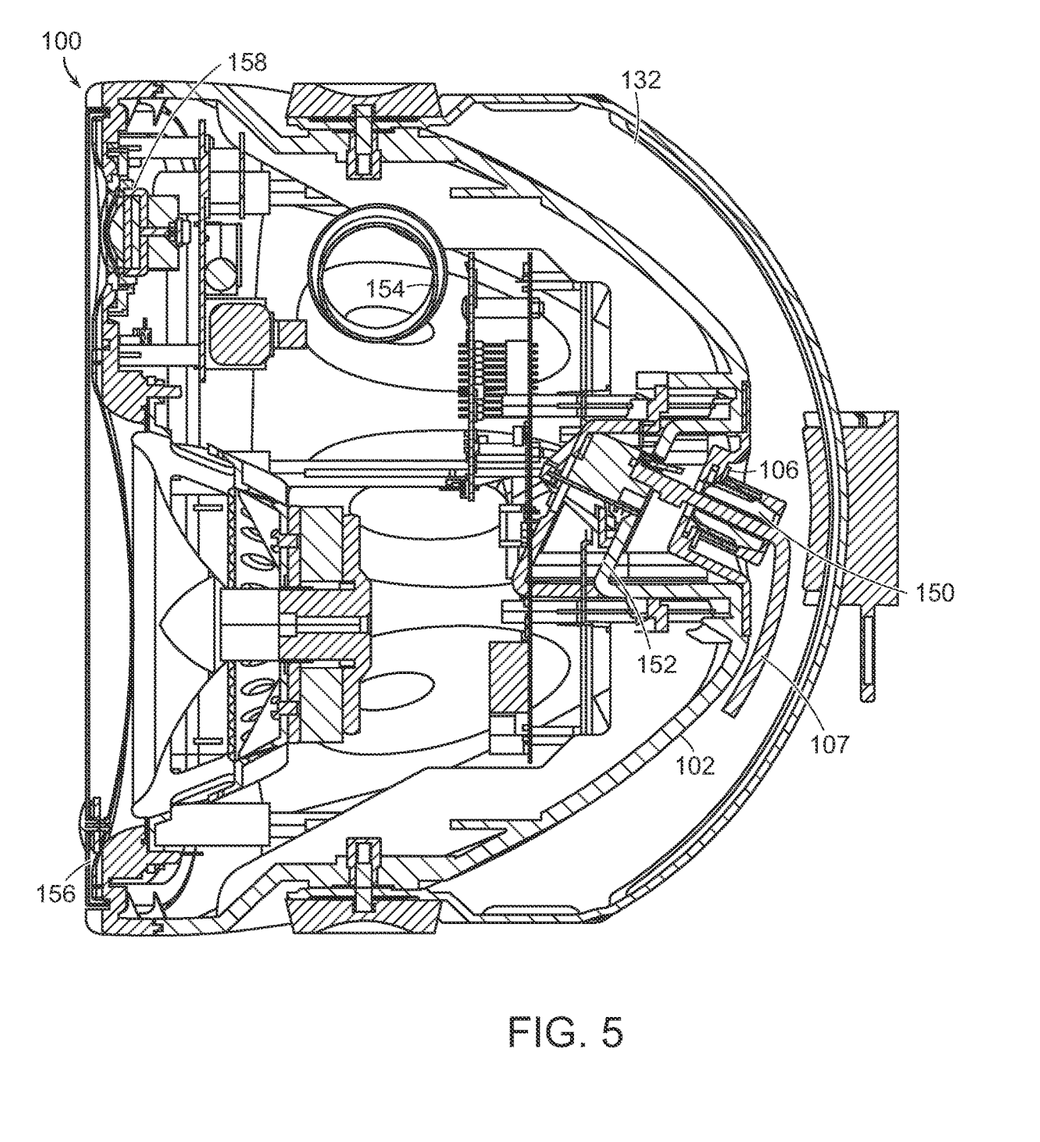
FIG. 5 is a cross-section view of the smart speaker in accordance with one or more embodiments.

FIG. 5 is a cross-section view of the smart speaker 100 depicting further features of the device.

A siliconized rubber grommet 150 with molded ribs at the Ethernet port 106 prevents moisture ingress into the housing 102. The grommet 150 is slotted to slide around the Ethernet cable jacket during installation. The installer does not need to attach Ethernet RJ45 to cable 107 while standing on ladder.

The cable pocket 152 in the housing 102 is angled to prevent any pooling of water around Ethernet cable 107 in most common speaker cabinet mounting positions.

The housing 102 includes an acoustic bass reflex port tube 154. This feature is screened to prevent or inhibit ingress of insects and detritus. The acoustic bass reflex port tube 154 is acoustically tuned for maximum Bass output with minimum speaker excursion. An optional port plug provides alternate acoustic characterization and maximum environmental resilience.

The bass driver design includes a cone 156 that is affixed by compressive assembly, rather than adhesion. This provides increased reliability, as adhered cones can be prone to failure. A plastic driver basket can be used to reduce weight compared to steel baskets.

A metal heat sink 158 is provided on the tweeter 108 to inhibit or prevent overheating at high volumes and permanent demagnetization.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

The invention claimed is:

1. A networked speaker device, comprising:
a sealed housing;
an Ethernet port in the housing configured to be coupled to an Ethernet cable to receive power and audio data transmitted over the Ethernet cable;
a power supply subsystem in the housing configured to manage the power received at the Ethernet port;
a microprocessor subsystem in the housing powered by the power supply subsystem and configured to receive and process the audio data to generate output audio signals;
at least one speaker driver in the housing;
a digital audio amplifier in the housing powered by the power supply subsystem, said digital audio amplifier amplifying the output audio signals received from the microprocessor system to drive the at least one speaker driver to render an audio output; and
at least one heater resistor in the housing powered by the power supply subsystem, wherein the at least one heater resistor is controlled by the microprocessor subsystem to automatically heat the interior of the housing when temperature inside the housing is below a given temperature.

2. The device of claim 1, wherein the power and audio data are received over the Ethernet cable from power sourcing equipment.

3. The device of claim 2, wherein the power sourcing equipment comprises a power over Ethernet enabled network router.

4. The device of claim 1, wherein the power supply subsystem is configured to receive power received at the Ethernet port over four wire pairs of the Ethernet cable.

5. The device of claim 1, wherein the audio data comprises a high-resolution digital audio stream from an online music service.

6. The device of claim 1, wherein the power is transmitted over the Ethernet cable as alternating current to the Ethernet port, and wherein the power supply subsystem comprises a diode bridge rectifier for converting the alternating current to direct current.

7. The device of claim 1, wherein the power supply subsystem includes a power supply controller configured to monitor the Ethernet port for the availability of power from a power over Ethernet enabled network router connected to the Ethernet cable, and to responsively request maximum available power from the power over Ethernet enabled network router.

8. The device of claim 1, wherein the power supply subsystem has an output of about 26 Volts DC to the digital audio amplifier and an output of about 5 Volts DC to the microprocessor subsystem.

9. The device of claim 8, wherein the power supply subsystem further comprises a step-down switch-mode power supply circuit that converts 26 Volt DC to 5 Volts DC.

10. The device of claim 1, wherein the microprocessor subsystem includes a processor having a clock speed of at least one GHz, and a random-access memory (RAM) having at least 256 Megabytes of memory.

11. The device of claim 1, wherein the audio data comprises a high-resolution digital audio stream from an online music service, and wherein the microprocessor subsystem includes a flash memory of for caching audio data from the online music service to allow continuous audio playback in the event of an outage of the online music service.

12. The device of claim 1, wherein the digital audio amplifier and the microprocessor subsystem support high-resolution digital audio sampling rates.

13. The device of claim 1, wherein the networked speaker device is connectable over a network to a plurality of other networked speaker devices configured to play audio content in synchrony.

14. The device of claim 1, wherein the power supply subsystem, the microprocessor subsystem, the digital audio amplifier, and the at least one heater resistor are integrated in one or more circuit boards in the housing.

15. The device of claim 1, wherein the housing comprises Polypropylene.

16. The device of claim 1, wherein the sealed housing comprises two molded Polypropylene pieces that are connected together by a single sealed seam.

17. The device of claim 1, wherein the sealed housing has a wall thickness of about 6-11 mm.

18. The device of claim 1, further comprising a rubber grommet at the Ethernet port to inhibit or prevent moisture ingress in the sealed housing.

19. The device of claim 1, further comprising an acoustic bass reflex port tube in the housing.

20. A speaker system, comprising:
(a) a power over Ethernet enabled network router configured to receive audio data over an Internet from an online music service; and
(b) a plurality of speaker devices connected to the network router by Ethernet cables, wherein each of the speaker devices comprises:
a sealed housing;
an Ethernet port in the housing configured to be coupled to one of the Ethernet cables connected to the network router to receive power and audio data from the network router;
a power supply subsystem in the housing configured to manage the power received at the Ethernet port;
a microprocessor subsystem in the housing powered by the power supply subsystem and configured to receive and process the audio data to generate output audio signals;
at least one speaker driver in the housing;
a digital audio amplifier in the housing powered by the power supply subsystem, said digital audio amplifier amplifying the output audio signals received from the microprocessor system to drive the at least one speaker driver to render an audio output; and
at least one heater resistor in the housing powered by the power supply subsystem, wherein the at least one heater resistor is controlled by the microprocessor subsystem to automatically heat the interior of the housing when temperature inside the housing is below a given temperature.

21. The system of claim 20, wherein the power supply subsystem of each speaker device is configured to receive power received at the Ethernet port over four wire pairs of the Ethernet cable.

22. The system of claim 20, wherein the audio data comprises a high-resolution digital audio stream from the online music service.

23. The system of claim 20, wherein the power supply subsystem of each speaker device includes a power supply controller configured to monitor the Ethernet port for the availability of power from the power over Ethernet enabled network router, and to responsively request maximum available power from the power over Ethernet enabled network router.

24. The system of claim 20, wherein the audio data comprises a high-resolution digital audio stream from the online music service, and wherein the microprocessor subsystem includes a flash memory of for caching audio data from the online music service to allow continuous audio playback in the event of an outage of the online music service.

25. The system of claim 20, wherein the speaker devices configured to play audio content in synchrony.

* * * * *